April 1, 1924.
V. C. KARDA
1,488,503
DOOR CONSTRUCTION FOR TRAPS
Filed July 21, 1922
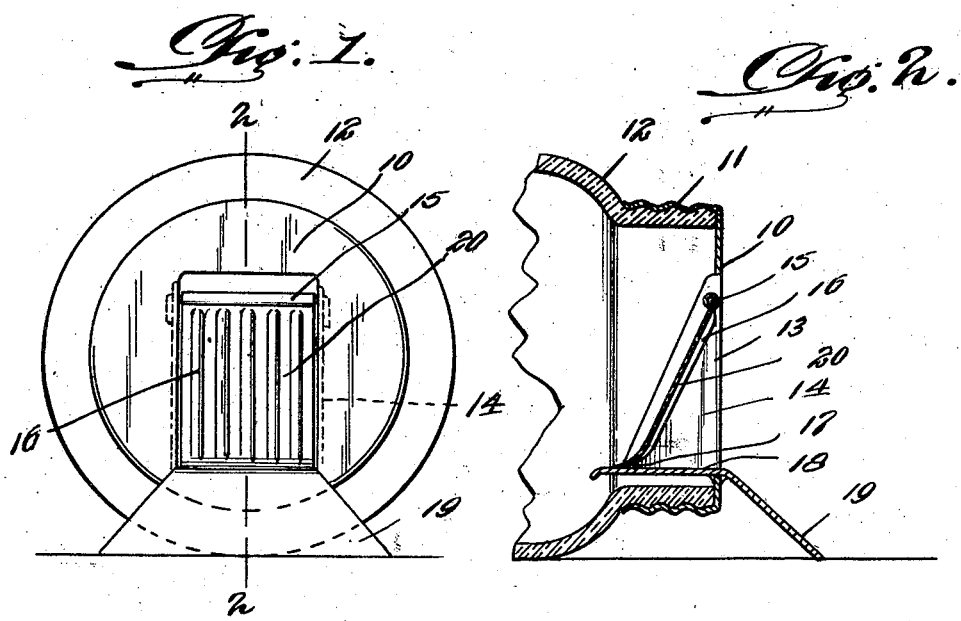

Patented Apr. 1, 1924.

1,488,503

UNITED STATES PATENT OFFICE.

VÁCSLAV C. KARDA, OF NEW YORK, N. Y.

DOOR CONSTRUCTION FOR TRAPS.

Application filed July 21, 1922. Serial No. 576,435.

*To all whom it may concern:*

Be it known that I, VÁCSLAV C. KARDA, a citizen of the United States of America, residing at New York, in the county of New York and State of New York, have invented new and useful Improvements in Door Constructions for Traps, of which the following is a specification.

In carrying out the present invention it is my purpose to improve and simplify the general construction of doors for traps, and to provide a door construction which may be manufactured and marketed at small cost, which will operate efficiently and effectively to permit the rodent to enter the trap and to prevent exit therefrom, and which will embody comparatively few parts, and these so arranged and corelated as to reduce the possibility of derangement to a minimum.

With the above recited objects in view, and others of a like nature, the invention consists in the construction, combination and arrangement of parts set forth in and falling within the scope of the appended claim.

In the accompanying drawings:

Figure 1 is a view in end elevation of a trap door constructed in accordance with my invention, showing the same as applied to an ordinary fruit jar to trap mice and other rodents.

Figure 2 is a similar view on the line 2—2 of Figure 1.

In the construction shown, my improved trap door comprises a disk 10 formed with an annular threaded flange 11 adapted to be engaged with the neck of a Mason jar 12. This disk 10 is formed with an opening 13 and the side edges of the opening 13 are formed with rearwardly extending aprons 14, respectively. Extending across the opening 13 at the upper end thereof and journaled in the upper ends of the aprons 14 is a rod 15. Pivoted upon the rod 15 and depending therefrom is a trap door 16 that extends downwardly and rearwardly, and has the lower end curved, as at 17. This curved end rests upon the horizontal portion of a platform 18 that is connected to the disk 10 at the lower end of the door opening therein. This platform 18 in addition to providing a horizontal portion 18 also provides a downwardly inclined portion 19 that is flared outwardly, as clearly shown in Figure 1 of the drawing, and engages the floor or other support upon which the jar 12 rests. The downwardly inclined portion 19 forms an entrance to the door opening 13 and also acts to prevent the jar from rolling. In accordance with my invention the door 16 is corrugated, as at 20, so that the same will be strengthened.

From the construction shown, it will be seen that when a rat or other rodent passes through the door opening 13 the trap door 16 will swing inwardly, and when relieved of the influence of the rodent will gravitate to closed position and the lower curved edge 17 thereof will engage the horizontal portion 18 of the platform, thereby preventing the escape of the rodent from the trap.

I have entered into a detailed description of the construction and relative arangement of parts embraced in the present and prefered embodiments of my invention with a view to imparting a full, clear and exact understanding of the said embodiments. I do not desire, however, to be understood as confining myself to the said specific construction and relative arrangement of parts, inasmuch as in the future practice of my invention such changes or modifications may be made as fairly fall within the scope of my invention as defined by my appended claim.

Having thus described the invention, what is claimed as new, is:—

A trap including a cylindrical receptacle having an open neck at one end, a closure for said end of the receptacle having an opening therein to form an entrance, a housing for said entrance extending into said neck of the receptacle and including a bottom, an inclined door pivotally mounted in said housing and extending inwardly of the neck of the receptacle to normally close said entrance, the lower end of said door being curved inwardly of the receptacle, and an outwardly extending outwardly inclined platform integral with the bottom of said housing, said platform being of trapezoidal form with its longer lower edge disposed to flatly contact a support when the receptacle is placed upon its side, whereby rolling of the receptacle is prevented by said inclined platform.

In testimony whereof I affix my signature.

VÁCSLAV C. KARDA.